June 29, 1965 J. R. SCHUETZ 3,191,954
LEVELING AND SUSPENSION SYSTEM FOR WHEELED VEHICLE
Filed Sept. 30, 1963 2 Sheets-Sheet 1

Inventor:
John R. Schuetz
By Bair, Freeman & Molinare Attys.

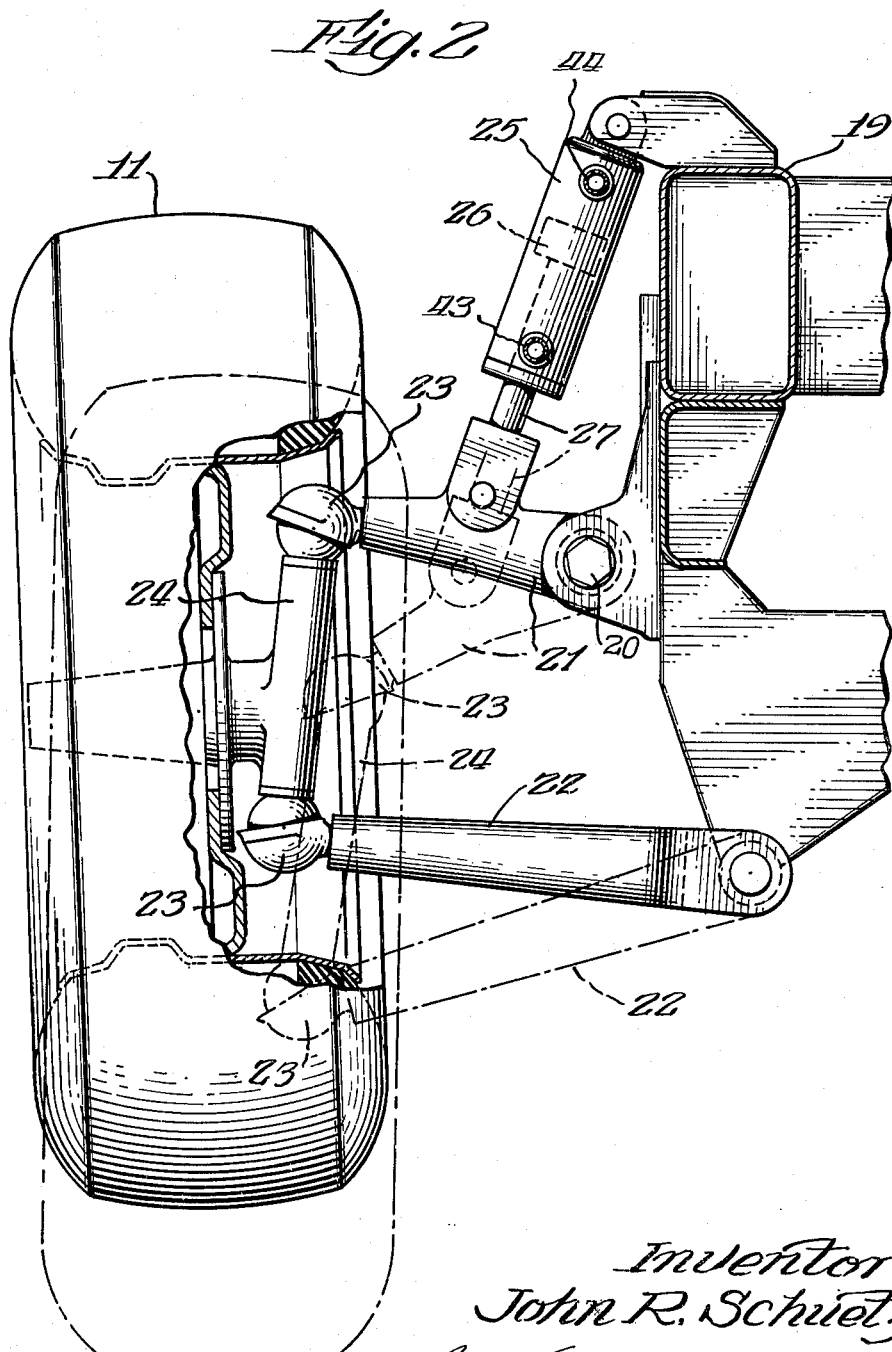

United States Patent Office 3,191,954
Patented June 29, 1965

---

3,191,954
LEVELING AND SUSPENSION SYSTEM FOR WHEELED VEHICLE
John R. Schuetz, Wausau, Wis., assignor to Drott Manufacturing Corporation
Filed Sept. 30, 1963, Ser. No. 312,643
3 Claims. (Cl. 280—6)

This invention relates to a leveling and suspension system and more particularly to a suspension system for wheeled vehicles which provides individual vertical movement of the wheels for leveling of the vehicle.

In wheeled vehicles carrying earth moving equipment or similar material handling devices, it becomes important at times to level the vehicle frame despite the fact that the wheels may be resting on a sloping or irregular surface. This is necessary to enable the material handling device carried by the vehicle to swing in a horizontal plane during operation so that ditching, digging or other similar operations can be performed properly.

It is accordingly one of the objects of the present invention to provide a leveling and suspension system in which wheels of a vehicle are individually controllable for raising or lowering action to level the vehicle frame.

Another object is to provide a leveling and suspension system in which the wheels are connected to and moved relative to the vehicle frame by fluid motors such as cylinder and piston units which are individually controllable by manually operated valves.

According to a feature of the invention the control valves are movable to four different positions, in one of which the actuating unit is energized to lower the wheel relative to the vehicle frame, in the second of which the actuating unit is energized to raise the wheel relative to the frame, in the third of which the actuating unit is locked to hold the wheel in an adjusted position, and in the fourth of which the actuating unit is bypassed for free movement so that the wheel can move in the normal manner.

The above and other objects and features of the invention will be more readily apparent from the following description when read in connection with the accompanying drawing in which:

FIG. 2 is a partial section with parts in elevation showing the suspension linkage for one of the wheels of the vehicle.

Figure 1:
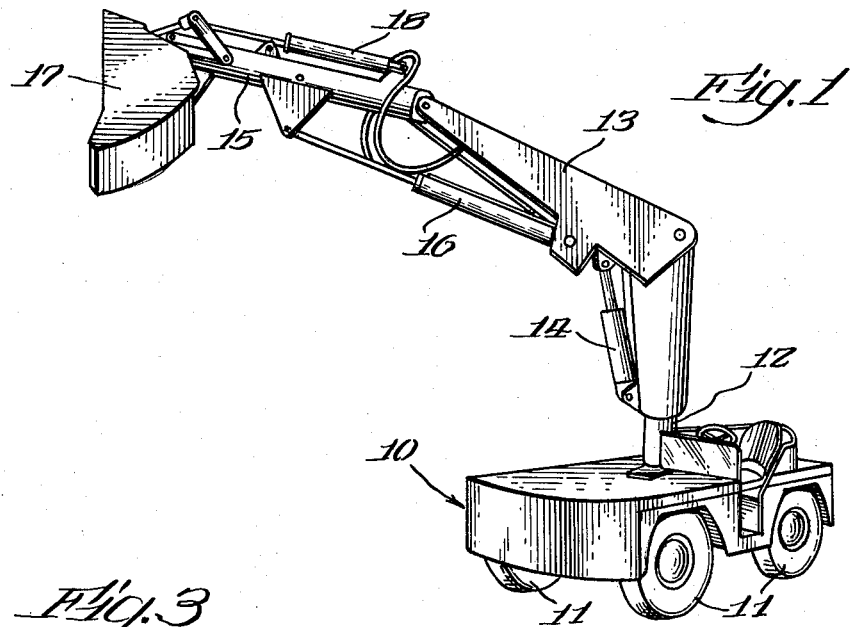
FIG. 1 is a perspective view of a vehicle equipped with the leveling and suspension system of the invention.

As shown in FIG. 1 the leveling and suspension system of the invention is applied to a wheeled vehicle whose frame is indicated generally at 10 and which is supported on four rubber-tired wheels 11. The vehicle may carry a material handling device shown as a shovel mechanism, although it will be understood that other types of devices such as back hoes, clamps, cranes or other material handling units could be equally well employed. The shovel device as shown comprises an upright post 12 on the vehicle which is mounted for swiveling movement about a vertical axis. An arm 13 is pivoted on a horizontal axis to the upper end of the post and is adapted to be raised and lowered by means of a hydraulic cylinder and piston unit 14 connected between the post and the arm. A second or fore-arm 15 is pivoted to the free end arm 13 on a horizontal axis and is swung relative to the arm 13 by a second hydraulic cylinder and piston unit 16. A material handling device such as a shovel or bucket 17 may be pivoted to the free end of the arm 15 and may be swung about its pivots by a hydraulic cylinder and piston unit 18 to pick up or to discharge material. It will be understood that the vehicle 10 is powered by a suitable motor which also operates a pump for supplying hydraulic fluid to the units 14, 16 and 18 as well as to the leveling and suspension system of the vehicle.

As best seen in FIG. 2, the vehicle is provided with a frame having side members 19 from which the wheels 11 are suspended for relative vertical movement. As shown, each of the wheels is connected to the frame through generally horizontal upper and lower links 21 and 22 which extend outwardly from the frame side members in vertically spaced relationship to each other. The outer ends of the links 21 and 22 are pivotally connected to the wheel and in the case of a steerable wheel, as shown in FIG. 2, may be connected through ball and socket joints 23 to the upper and lower ends of a king pin 24 which supports a stub axle on which the wheel is rotatable. Spring means, preferably in the form of a torsion bar 20 to which the inner end of the upper link 21 is secured, are provided to urge the links and the wheel downwardly relative to the frame to support the normal weight of the vehicle and the material handling device thereon in the usual manner. As shown in FIG. 2 one end of the torsion bar is of hexagonal or similar noncircular section and fits into a complementary socket in the hub of the link 21 with the torsion bar extending along the frame and secured thereto at its other end, all as conventional in the art.

According to the present invention, each of the wheels is additionally provided with a cylinder and piston unit comprising a cylinder 25 pivoted at its upper end to the frame side rail 19. A piston 26 in the cylinder has its piston rod 27 extending through the lower end of cylinder and pivotally connected to the upper link 21, as shown. By supplying fluid under pressure to the upper end of the cylinder 25, the piston will be moved downwardly to move the wheel downwardly relative to the frame thereby to raise the adjacent corner of the frame. By supplying fluid to the lower end of the cylinder 25, the piston will be moved upwardly to raise the wheel relative to the frame against the normal suspension spring to lower the adjacent corner of the frame. When the connections to the cylinder are blocked the cylinder and piston unit will be locked to hold the wheel in its existing position relative to the frame for operation of the material handling device. For normal running, the ports at the opposite ends of the cylinder are interconnected so that the piston can move relatively freely in the cylinder thereby allowing the spring system of the vehicle to support it in the usual manner with the cylinder and piston unit serving only as a dashpot.

Figure 3:
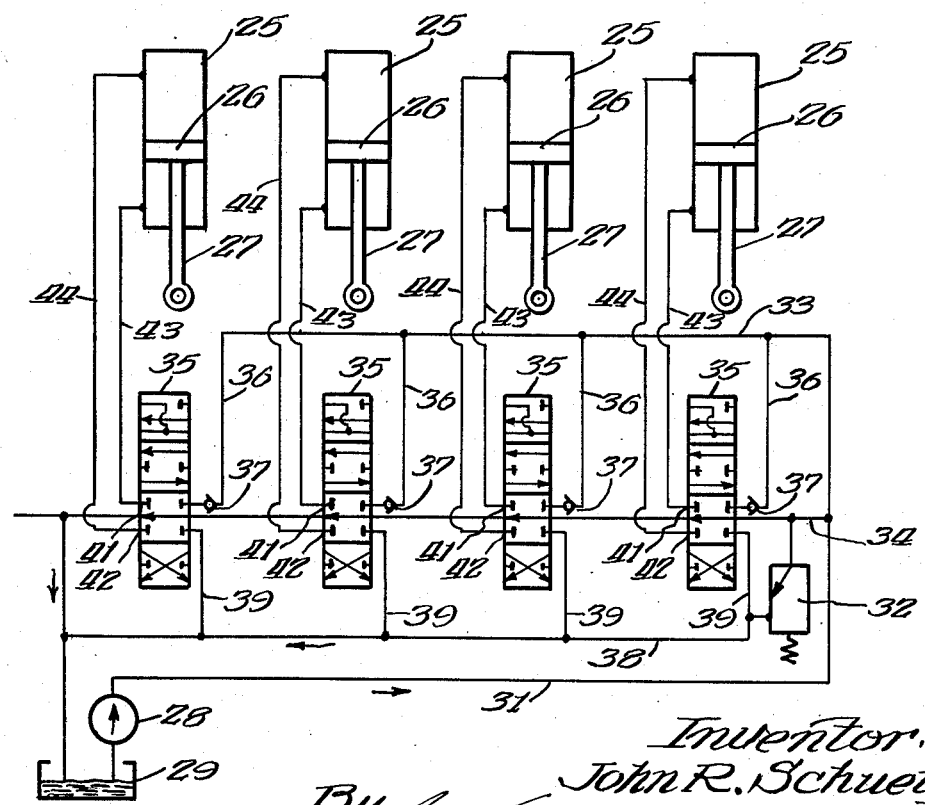
FIG. 3 is a hydraulic circuit diagram.

The several cylinders 25 are interconnected in a hydraulic control system as illustrated in FIG. 3 for individual control of the wheels so that the vehicle frame can be leveled even though the wheels are resting on sloping or uneven ground. As diagrammatically illustrated, fluid under pressure is supplied by a pump 28 which receives liquid from a storage tank or sump 29. The pump discharges fluid under pressure to a supply conduit 31 which communicates with a pressure relief valve 32 to limit the pressure supply and with a manifold 33. The supply line 31 communicates through a cross-connection 34 with a central inlet port on a valve 35, there being four such valves 35, one to control each of the hydraulic cylinder and piston units 25. The supply manifold 33 is connected through a line 36 and a check valve 37 to a pressure inlet port for each of the valves 35 which pressure inlet port is above the inlet port for the line 34. A return or exhaust conduit 38 is connected through conduits 39 to exhaust ports for each of the valves below the inlet port communicating with the line 34. The line 38 returns to the tank or sump 29 and the line 34 continues through the several valves in series and returns to the tank or sump 29. If desired, the return fluid can be utilized to supply operating fluid to different types of devices associated with the vehicle, such as power steering devices or the like.

Each of the valves 35 is provided with two outlet ports 41 and 42 which are respectively above and below the line 34. These ports in the locked position of the valve as shown communicate with conduits 43 and 44, respectively, which are connected to the lower and upper ends of the respective cylinders 25.

Each valve 35 is provided with passages therethrough as indicated diagrammatically in FIG. 3 providing four valve positions. In the valve position shown, the conduits 36 are closed, the return branch conduits 39 are closed and both of the ports 41 and 42 for each valve are closed. In this position of the valves, the lines 43 and 44 leading to the cylinders 25 are closed so that the pistons 26 in the cylinders will be locked in their existing positions to hold the respective wheels against any vertical movement. This is the position normally occupied by the valves when the vehicle is stopped and the material handling device thereon is being utilized. It will be noted that the wheels may be locked in different vertical positions to hold the frame of the vehicle in a level position so that the material handling device can be used for normal digging or similar operations.

To lower any one of the wheels the corresponding valve 35 is moved upward so that the lowermost section thereof registers with the conduits 36 and 39 and with the ports 41 and 42. It will be noted that this section of the valve incorporates cross passages so that the supply conduit 36 communicates with the port 42 to supply actuating fluid through the conduit 44 to the upper end of the corresponding cylinder 25. At the same time the lower end of the cylinder is connected through the conduit 43 and the port 41 to the exhaust branch conduit 39 so that fluid will be exhausted from the lower end of the cylinder. The piston 26 of that cylinder will therefore be moved down to move the corresponding wheel down relative to the frame thereby to raise the corresponding corner of the frame. When the wheel has been moved down to the desired extent the valve may be returned to its blocking position, as shown, to lock the wheel in its adjusted position.

To raise any one of the wheels the corresponding valve will be moved down to bring the section immediately above the blocking section into registration with the conduits and ports. It will be seen that this section of the valve incorporates straight-through passages so that the conduit 36 will be connected to the port 41 and through the conduit 43 to the lower end of the corresponding cylinder 25. At the same time the upper end of the cylinder will be connected through the conduit 44 and port 42 to the return branch conduit 39 to exhaust fluid from the upper end of the cylinder. The piston in that cylinder will therefore be moved upwardly to raise the corresponding wheel and to lower the corresponding corner of the frame.

When any one or all of the valves are moved to their extreme lower position the upper valve section will communicate with the ports and passages. It will be noted that in this position of the valve the supply conduit 36 is blocked, the port 42 communicates with the return branch conduit 39 and the port 41 is cross connected to the port 42. In this position of the valve the line 34 is also opened. At this time the piston may move freely in the cylinder with fluid from either end flowing through the valve passages and into the other end so that the cylinder produces only a dashpot effect to dampen any movement of the piston and of the wheel to which it is connected. Also, because both ends of the cylinder are open to the low pressure return passage, the differences in displacement of the piston at opposite ends of the cylinder due to the effect of the piston rod are compensated so that the piston can move with relative freedom.

It will be seen that in the blocked position of the valves shown in the drawing and in the lowered position of the valves which they normally occupy during transport of the vehicle, the line 34 will be open through all of the valves. Fluid under pressure may therefor be taken from the left end of line 34 to operate power steering devices or other auxiliaries instead of being returned directly to the tank or sump.

It will be seen that with the suspension and leveling system of the present invention, the individual wheels of the vehicle can be adjusted vertically relative to the frame to level the frame regardless of the contour of the ground on which the vehicle is supported. The vehicle frame can be locked in its level position for normal use of the material handling unit thereon or can be freed so that the wheels can move against their springs in the usual manner when the vehicle is being transported from place to place.

While one embodiment of one invention has been shown and described in detail, it will be understood that this is for purposes of illustration only and is not to be taken as a definition of the scope of the invention, reference being had for this purpose to the appended claims.

I claim:

1. A leveling and suspension system for a wheeled vehicle having a frame, wheels on which the frame is mounted, and linkage individually connecting the wheels to the frame for vertical movement relative thereto, the suspension system comprising a fluid motor connected to each of the wheels to move it vertically relative to the frame, a fluid pump to supply operating fluid to the motors, and valves individually connecting the fluid motors to the pump and individually operable to move the wheels individually relative to the frame, each valve having a first position in which it supplies operating fluid to its corresponding motor in a direction to lower the corresponding wheel relative to the frame, a second position in which it supplies operating fluid to its corresponding motor in a direction to raise the corresponding wheel relative to the chassis, a third position in which it blocks flow of fluid to or from its corresponding motor to lock the motor, and a fourth position in which it interconnects opposite sides of the motor to permit free movement of the motor.

2. A leveling and suspension system for a wheeled vehicle having a frame, wheels on which the frame is mounted, and linkage individually connecting the wheels to the frame for vertical movement relative thereto, the suspension system comprising a cylinder and piston unit connecting each of the wheels to the frame to move it vertically relative to the frame, a source of actuating fluid under pressure, a low pressure return for the fluid, a valve for each of the units, and connections from each valve to opposite ends of the corresponding cylinder, each valve being adjustable to connect the connections selectively to the source and the return, to close the connections thereby to lock the unit, and to interconnect the connections for free movement of the unit.

3. A leveling and suspension system for a wheeled vehicle having a frame, wheels on which the frame is mounted, and linkage individually connecting the wheels to the frame for vertical movement relative thereto, the suspension system comprising a cylinder and piston unit connecting each of the wheels to the frame to move it vertically relative to the frame, a liquid pump having an outlet and an inlet, a valve for each of the cylinder and piston units connected to both the pump inlet and the pump outlet, and connections from each valve to opposite ends of the corresponding unit, each valve being adjustable to connect the pump inlet and outlet selectively to opposite ends of the unit to move the connected wheel selectively up or down relative to the frame, to close the connections to both ends of the unit thereby to lock the unit, and to interconnect both ends of the unit to each other and to the pump inlet whereby the unit can float freely.

References Cited by the Examiner

UNITED STATES PATENTS

| | | | |
|---|---|---|---|
| 1,829,451 | 10/51 | McNab | 254—86 |
| 2,377,278 | 5/45 | Stephens | 137—596.12 X |
| 2,812,193 | 11/57 | Grace | 254—86 X |
| 2,919,931 | 1/60 | Cislo. | |
| 3,063,510 | 11/62 | Hunger | 180—9.2 |
| 3,117,800 | 1/64 | Magnuson | 280—124 |

FOREIGN PATENTS 470,520  8/37  Great Britain.

A. HARRY LEVY, *Primary Examiner*.

LEO FRIAGLIA, *Examiner*.